No. 783,613. PATENTED FEB. 28, 1905.
J. T. CLARKE.
PHOTOGRAPHIC FILM PACKAGE FOR COLOR PHOTOGRAPHY.
APPLICATION FILED JULY 25, 1904.
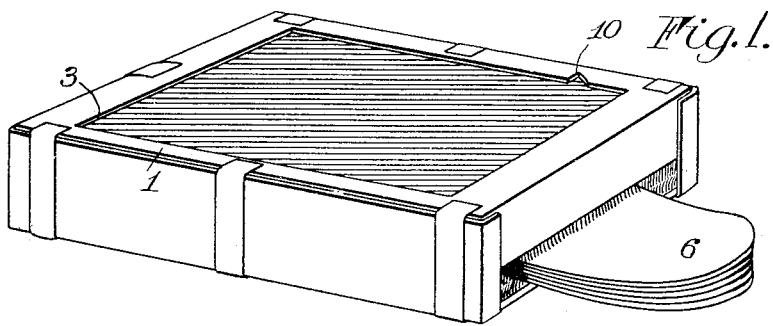
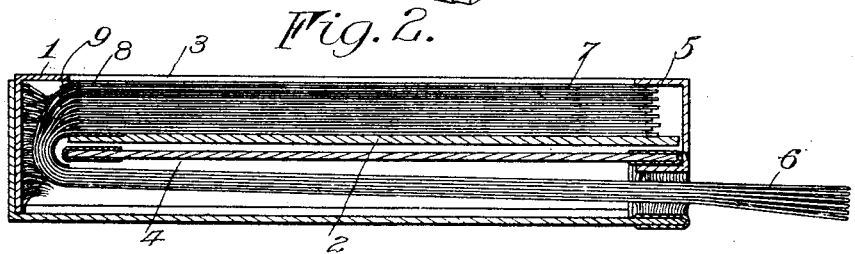
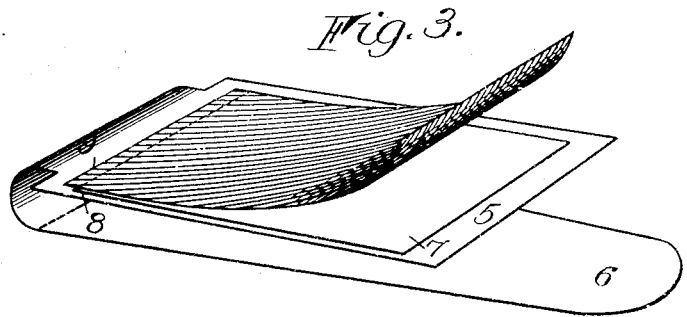
Witnesses
Inventor
Joseph Thacher Clarke
By
Attorney No. 783,613.

Patented February 28, 1905.

UNITED STATES PATENT OFFICE.

JOSEPH THACHER CLARKE, OF HARROW, ENGLAND, ASSIGNOR TO EASTMAN KODAK COMPANY, OF ROCHESTER, NEW YORK, A CORPORATION OF NEW YORK.

PHOTOGRAPHIC-FILM PACKAGE FOR COLOR PHOTOGRAPHY.

SPECIFICATION forming part of Letters Patent No. 783,613, dated February 28, 1905.

Application filed July 25, 1904. Serial No. 218,003.

*To all whom it may concern:*

Be it known that I, JOSEPH THACHER CLARKE, a citizen of the United States, residing at Harrow, Middlesex county, England, have invented certain new and useful Improvements in Photographic-Film Packages for Color Photography; and I do hereby declare the following to be a full, clear, and exact description of the same, reference being had to the accompanying drawings, forming a part of this specification, and to the reference-numerals marked thereon.

This invention relates to a novel means for exposing the negatives required in the process of three-color photography, and has for its primary purpose to provide an assemblage or pack of flexible negative material so conjoined with flexible color-screens attached thereto that the changing of the negatives from their position in the focus of the lens may be effected with greater rapidity, greater ease, and greater certainty than has hitherto been possible.

A secondary advantage of this invention is that the color-screens employed in the improved packs are more economical in cost of manufacture and more regular in tint than are the glass screens now in general use and are, furthermore, preserved from fading or other alterations of tint through the action of sunlight, since they are from the instant of their preparation protected from all actinic rays by a light-tight packing.

To these and other ends my invention consists in certain improvements and combination of parts, all as will be more fully described, the novel features being pointed out in the claims at the end of the specification.

In the accompanying drawings, forming a part of this specification, Figure 1 is a perspective view of a film package or carrier adapted for my films and screens. Fig. 2 is a sectional view of a film-package contained in an adapter and embodying my invention. Fig. 3 is a perspective view of a sheet of film with its color-screen embodying my invention and adapted for use in the film-pack.

Similar reference-numerals in the several figures indicate similar parts.

In carrying this invention into effect I provide three sensitized films, each of which may be specially prepared by any of the known orthochromatic processes, so as to be peculiarly receptive of those color-rays to which they are to be exposed, and I attach to the face of each of these films a color-screen or light-filter made by incorporating into a flexible and transparent base a suitable quantity of the dye or stain selected. When water-soluble dyes are employed for the coloring of the screens, the base may be gelatin. When the dyes are not water-soluble, but may be dissolved in alcohol, ether, acetone, amyl acetate, or any like fluid which is a solvent of nitrocellulose or is miscible with a solution thereof, then the base may be celluloid. In both the above cases the screens may be formed by evenly coating the stained vehicle or base (gaged to a regular depth of tint by the addition of a fixed percentage of the chosen dye) upon a glass table, preferably by the aid of a mechanical emulsion or film coating machine, as will be readily understood by those skilled in the art. When dry, the substance of the color-screen is stripped from the temporary support provided by the glass and is cut up into such separate sheets as may be required.

For the process of three-color photography, as is well known, three screens of different colors, which together cover the entire range of the spectrum, are employed. The first of these screens is, in accordance with the present invention, attached, preferably by pasting at one edge—namely, that edge in the direction of which the negative is to be withdrawn—to the first sensitized film or to its backing of opaque paper or like support. The second flexible color-screen is attached to the second film, and the third screen to the third film in like manner each to each. The three sensitized films thus united to their respective color-screens are then so packed that they can readily be changed *seriatim* from the focus of the lens, the withdrawal of the first film after exposure leaving the second film, covered by its color-screen, in position for the second exposure, and so on. Thus for the purpose of the three-color photography at present in vogue each complete color-film pack will consist of three separate sensitized films or three exposure lengths of film, with three screens of different color attached to the faces thereof, together with such opaque backings of black paper or similar material as may be necessary to prevent the transmission of light through one film to another during exposure. Such color-packs may of course consist not of three sensitive surfaces only, but of any multiple of such triple groups, or, and preferably, the packs may be inclosed in special carriers provided with tabs for the separate withdrawal of each exposure and its adjunct—as, for instance, in the carriers described in the United States Letters Patent No. 728,718. Such packs can, when introduced into the holders or adapters described in the United States Letters Patent No. 728,719, be directly applied to any ordinary photographic camera for the purpose of making negatives for the three-color process.

In the embodiment of my invention illustrated in the drawings I have shown the film-package contained in United States Letters Patent No. 728,718, the casing being indicated by 1, divided by a septum 2 into the holding-chamber 3 and the receiving-chamber 4 for exposed films. The backings 5, of black paper, are provided with the separable tabs 6, and the flexible film (indicated by 7) is attached at 8 to said backing, while the color-screen of flexible material for each film is also attached to the film or preferably to the backing 5 at the forward end—say at the point indicated by 9. When packs of this kind are made up in accordance with the principle of the present invention, they will consist of the following sequence of flexible surfaces: first, the so-called "safety-cover" of black paper or the like, for the protection of the sensitive surfaces from the light, then the first color-screen, and behind this and attached thereto the first sensitive surface, followed by the black backing-paper, a portion of which projects from the carrier in the form of a tab for the purpose of withdrawal. It will be understood that all these three—namely, film, screen, and backing-paper—are removed from the focus of the lens together and at once by pulling up the first projecting tab. This triple withdrawal having been effected by a single movement, the second sensitive surface covered by its color-screen will be in position for the reception of the second image. So likewise and in succession after the second withdrawal will be the third.

Register-marks for the purpose of readily determining the correct superposition of the pigment-prints to be made from the three negatives may be provided by notches 10, Fig. 1, upon the margin of the exposure-aperture of the carrier. These notches will naturally be reproduced upon the developed films in exactly the same position relatively to the images projected thereupon by the lens, or for the same purpose perforations, such as punctures with a needle, may be made through the entire series of films after they are in position in the pack. The tabs employed for withdrawing the films from the exposure to the storage chamber of the carrier may have upon them any suitable markings indicating to the operator the color of the screen attached thereto, and preferably the tabs of the films for each series are marked with a corresponding number or characteristic mark, so that he may know that he has exposed the whole series of films necessary for the production of the three-color negatives for which this invention is particularly adapted.

Packs of films and screens made up in accordance with this invention may be exposed in the most rapid succession and with perfect ease and certainty. The employment of a multiplicity of dark backs is hereby rendered unnecessary, the change from one surface to another being effected by a single operation and without the removal of the holder or adapter from the camera between the successive openings of the lens. The three exposures having been effected, the color-pack is torn apart in the dark room, the color-screens and backing-papers may be thrown away, and the three sensitized films, representing the images of the three chosen colors of nature, are ready for development.

I claim as my invention—

1. A film-package embodying a series of superposed sheets of sensitized photographic film, each film-sheet being covered by a differently-tinted color-screen which is movable with it.

2. A film-package embodying a series of superposed film-supporting sheets of opaque material, each sheet having attached thereto a sensitized photographic film and a transparent color-screen.

3. A film-package embodying superposed flexible sheets of opaque material, each having a flexible photographic film and a flexible color-screen extending over the film thereon, the sheets and films being arranged in a plurality of similar series and each series containing screens of three different colors.

4. A film-package embodying superposed flexible sheets of opaque material each having a flexible photographic film and a flexible color-screen extending over the film thereon, the sheets and films being arranged in a plurality of similar series each series containing screens of three different colors, and indicating-marks on the opaque sheets for designating the series to which it belongs.

5. A film-package for color photography embodying a holder having an exposure-aperture and designating-marks at the edges thereof, a series of sensitized films therein each having a color-screen attached thereto and movable therewith, said screens extending over the face of the film.

JOSEPH THACHER CLARKE.

Witnesses:
H. D. JAMESON,
F. L. RAND.